United States Patent [19]

Jones et al.

[11] Patent Number: 5,399,868
[45] Date of Patent: Mar. 21, 1995

[54] RADIATION PROBE

[76] Inventors: Barbara L. Jones, 80 Chisbury Close, Forest Park, Bracknell, RG12 3TX, England; Tom L. Nam, 114 6th Avenue, Bez Valley, Transvaal, South Africa; Shawn Araikum, 55 Hugo Road, Sydenham, Durban, Natal, South Africa; Rex J. Keddy, 3 Bevan Road, Rivonia, Transvaal, South Africa

[21] Appl. No.: 30,837

[22] Filed: Mar. 12, 1993

[30] Foreign Application Priority Data

Mar. 12, 1992 [GB] United Kingdom ............... 9205458

[51] Int. Cl.6 ............................................. G01T 1/10
[52] U.S. Cl. .............................. 250/484.2; 128/653.1; 128/659; 250/458.1; 250/484.3; 250/484.4; 250/484.5; 250/485.1
[58] Field of Search ............... 250/484.2, 484.3, 458.1, 250/484.4, 484.5, 485.1; 128/659, 653.1

[56] References Cited

U.S. PATENT DOCUMENTS

| | | | |
|---|---|---|---|
| 4,945,245 | 7/1990 | Levin | 250/461.2 |
| 4,999,504 | 3/1991 | Braunlich et al. | 250/484.5 |
| 5,012,108 | 4/1991 | Nam et al. | 250/484.3 |
| 5,030,834 | 7/1991 | Lindmayer et al. | 250/484.5 |
| 5,242,373 | 9/1993 | Scott et al. | 600/7 |

Primary Examiner—Constantine Hannaher
Attorney, Agent, or Firm—Scully, Scott, Murphy & Presser

[57] ABSTRACT

The instant invention relates to a method and an apparatus of monitoring nuclear radiation. The method utilizes a diamond radiation sensor element having a nitrogen impurity concentration of less than 150 ppm. The sensor element is subjected to nuclear radiation, while being stimulated with light of a selected wavelength or range of wavelengths, preferably in the ultraviolet or near-ultraviolet range, resulting in light emissions from the sensor element. Typically, the sensor element is fixed to the end of an optical fibre, the far end of the fibre being used to channel stimulating light to the sensor element and to feed resultant light emissions from the sensor element to a photomultiplier tube.

34 Claims, 5 Drawing Sheets

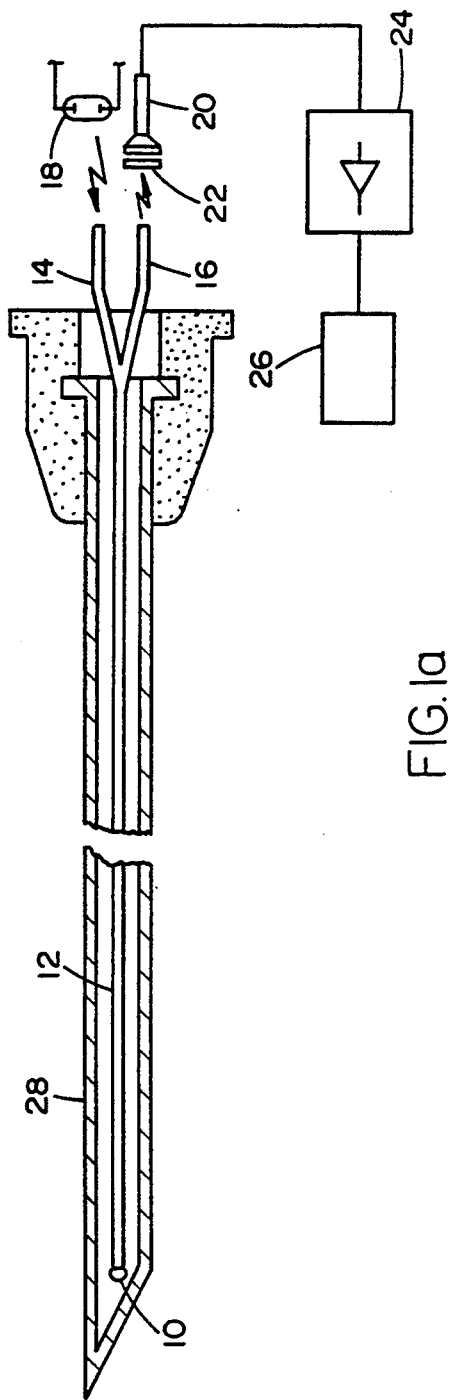
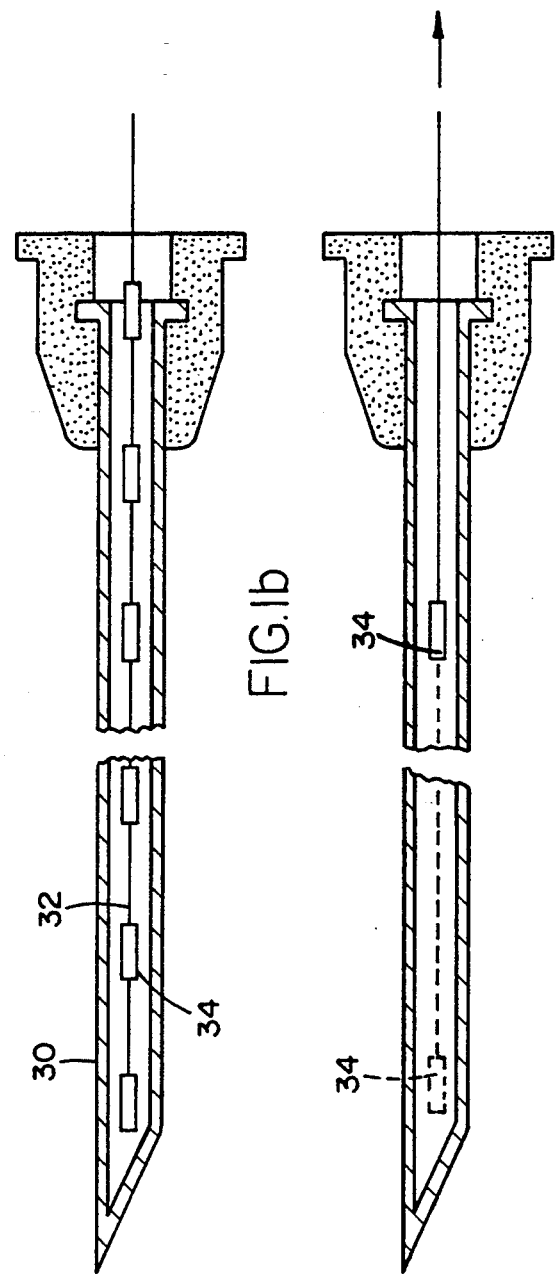

5,399,868

RADIATION PROBE

BACKGROUND OF THE INVENTION

This invention relates to a method of monitoring nuclear radiation and to a sensor and apparatus for monitoring such radiation.

It has become common to treat patients, for example, cancer patients, with nuclear radiation from selected radiation sources. To maximise the effectiveness of such treatment and to minimise its side effects, it is important to monitor the radiation dose delivered and also to ensure that the dose is delivered to the correct site.

It has also become increasingly common to use radiation from Co 60 sources and electron beams in the sterilisation of medical products, and in the processing of food products to increase their shelf life. To maximise the effectiveness of such treatment, it is important to monitor the radiation dose delivered to each product or package and also to ensure that the dose delivered to all the products inside a package is within internationally accepted prescribed limits.

SUMMARY OF THE INVENTION

According to the invention a method of monitoring nuclear radiation comprises:

providing a diamond radiation sensor element having a nitrogen impurity concentration of less than 150 ppm;
subjecting the sensor element to nuclear radiation;
stimulating the sensor element with light of a selected wavelength or range of wavelengths; and
monitoring resultant light emissions from the sensor element.

The method preferably includes stimulating the sensor element and monitoring the resultant light emissions therefrom via a common light conduit.

The common light conduit may be an optical fibre, the sensor element being located at a first end of the fibre and the stimulating light being applied to a second end of the fibre, the resultant light emissions also being monitored at the second end of the fibre.

Preferably, the second end of the fibre has an input portion and an output portion, the stimulating light being applied to the input portion and the resultant light emissions being monitored via the output portion.

The resultant light emissions may be passed through an optical filter selected to pass light in a predetermined spectral range corresponding to that of the expected resultant light emissions.

The filtered resultant light emissions may be amplified by photomultiplier means to provide an electronic signal corresponding to the intensity of the emissions, the electronic signal being processed to derive an indication of the intensity of the radiation incident on the sensor.

The sensor element may be used as an in viva radiation sensor, in which case it is positioned at a site which is subjected to radiation.

The sensor element may be inserted into the body of a patient, for example, transdermally, or into a body orifice.

The sensor element may be inserted into a first needle or catheter which is inserted into the body of the patient.

At least one nuclear radiation source element may be inserted into a second needle or catheter which is inserted into the body of the patient adjacent to the first needle or catheter.

The method may further include adjusting the position of the at least one radiation source element relative to the sensor element, to provide a desired overall radiation dose and dose pattern.

In another embodiment of the method, the sensor element may be placed on or attached to an object which is irradiated. For example, the sensor may be attached by means of adhesive to the object.

The method may include the step of adjusting the duration, intensity, or site of application of the applied nuclear radiation in response to the monitored light emissions from the sensor element, according to predetermined criteria.

Further according to the invention a sensor for monitoring nuclear radiation comprises:

a diamond radiation sensor element selected for a nitrogen impurity concentration of less than 150 ppm; and
a light conduit adapted to be attached to or held adjacent to the sensor element, the light conduit having an input portion which can be fed with light of a selected wavelength or range of wavelengths to stimulate the sensor element, and an output portion which can direct resultant light emissions from the sensor element to monitoring means.

Preferably, the light conduit is an optical fibre having a first end which is fixed to or held adjacent to a contact site on the sensor element, and a second end which is bifurcated to define the input and output portions of the sensor.

The optical fibre may have a first end which is fixed to or held adjacent to a contact site on the sensor element, for example by means of adhesive or a clamping arrangement, and a second end which is bifurcated to define the input and output portions of the sensor.

According to another embodiment of the invention a sensor for monitoring nuclear radiation comprises:

a diamond radiation sensor element selected for a nitrogen impurity concentration of less than 150 ppm;
a light tight housing defining a cavity in which the sensor element is supported; and
a probe engagable with the cavity in the housing and including at least one light conduit having an input portion which can be fed with light of a selected wavelength or range of wavelengths to stimulate the sensor element, and an output portion which can direct resultant light emissions from the sensor element to monitoring means.

Preferably, the probe supports at least one first optical fibre having an input portion which can be fed with light of a selected wavelength or range of wavelengths, and an output portion for directing the light onto the sensor element to stimulate it; and a second optical fibre having an input portion for receiving resulting light emissions from the sensor element, and an output portion for directing the light emissions to monitoring means.

The probe may comprise a tubular body with the second optical fibre disposed axially therein, and a plurality of first optical fibres being disposed about the second fibre and parallel thereto, so that light from the output portion of the first optical fibre is directed to an outer region of the sensor element in use, and light emissions from an inner region of the sensor element are received by the input portion of the second optical fibre in use.

The cavity of the light tight housing may be closed with a membrane which can be pierced by the tip of the probe when the probe is engaged with the cavity.

The light tight housing may fastening means such as an adhesive backing for securing the housing to a surface.

Preferably, the sensor element is selected to have a nitrogen impurity concentration of between 10 and 150 ppm, and most preferably between 10 and 60 ppm.

The sensor element may also be selected to have a boron concentration in the range of 0.1 to 10 ppm.

Still further according to the invention apparatus for monitoring nuclear radiation comprises a sensor as defined above, a light source for generating light of the selected wavelength or range of wavelengths, and monitoring means for receiving the light emissions from the sensor.

The light source may comprise a lamp, such as a mercury lamp, an LED or a laser device which provides an intense output in the ultraviolet or near-ultraviolet region.

The monitoring means may comprise a photomultiplier tube or another light amplification means.

The photomultiplier tube may be provided with a filter selected to pass light in a predetermined spectral range corresponding to that of the expected resultant light emissions from the sensor element, and to reject light from the light source.

The filter is preferably selected to pass light with a wavelength between 420 and 550 nm.

Preferably, the filter is selected to pass light with a wavelength between 516 and 536 nm.

The monitoring means may include amplifier means for amplifying the output of the photomultiplier means, and processing means for deriving an indication of the intensity of the radiation incident on the sensor element therefrom.

BRIEF DESCRIPTION OF THE DRAWINGS

FIGS. 1a, 1b and 1c are schematic illustrations of one embodiment of apparatus according to the invention;

DESCRIPTION OF EMBODIMENTS

Numerous problems occur when using nuclear radiation sources to irradiate tumours in patients. In particular, where radiation must be applied to a deep site, it is very difficult to make in vivo measurements of the radiation dose applied.

Figure 1D:
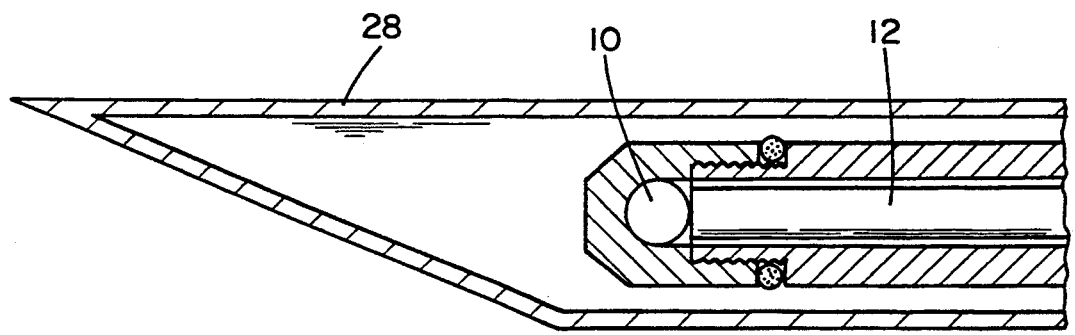
FIGS. 1d, 1e and 1f are schematic illustrations representing means for holding or clamping the optical sensor to the optical fiber.
Figure 1E:
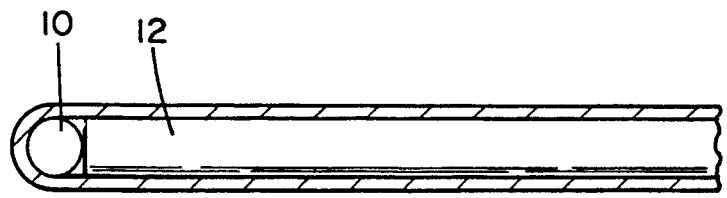
Figure 1F:
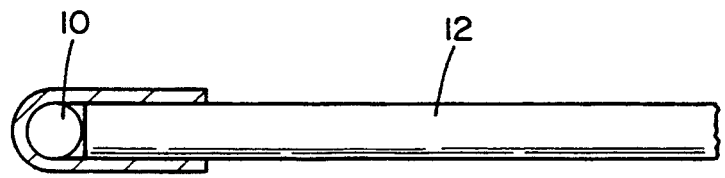

In FIG. 1a of the drawings, a radiation sensor is shown which comprises a small diamond sensor element 10 at the end of an optical fibre 12. The illustrated sensor element 10 has a flat contact site which is held against or adjacent to the end of the optical fibre, for good light transmission between the two. The sensor element 10 is typically less than 1 mm in diameter, and the optical fibre 12 has a similar diameter. The sensor element can be held or clamped mechanically in position relative to the optical fibre, for example, as shown in FIGS. 1d, 1e and 1f. Also, the sensor element can be fixed into position with a suitable adhesive or cement.

The diamond sensor element is selected to have similar characteristics to that of a sensor element used as a thermoluminescent detector. The diamond is selected to have a nitrogen impurity concentration of less than 150 ppm, and preferably between 10 and 150 ppm. The most preferable nitrogen impurity range is between 10 and 60 ppm. Such diamonds are classified as having a low to medium nitrogen concentration. Ideally, the sensor element also contains a small boron impurity concentration of between 0.1 and 10 ppm, which improves the linearity of the sensor's response.

The diamond sensor element can be a selected natural diamond, but will typically be manufactured using conventional techniques. For example, the sensor element can be a synthetic diamond crystal or may comprise a layer of crystalline or polycrystalline diamond deposited on a substrate by chemical vapour deposition (CVD). In the latter case, it is relatively easy to obtain a sensor element with a flat surface, which can readily be attached to the end of the optical fibre 12.

The end of the optical fibre remote from the sensor element 10 is bifurcated into an input portion 14 and an output portion 16. The input portion 14 is connected in use to a mercury lamp 18 which provides an output which is rich in ultraviolet radiation. The output portion 16 is connected to a photomultiplier tube 20 via an optical filter 22. The output of the photomultiplier tube 20 is connected via an amplifier 24 to a monitoring circuit 26. The optical fibre may be fairly long, for example between 25 and 50 cm long, and can be inserted into a hollow hypodermic needle 28 which has a closed end and an internal diameter of about 1 mm or less. To insert the sensor into the body of a patient, the needle 28 is inserted at a selected site to the required depth, and the sensor can then be fed into the needle from its exposed end.

In FIG. 1b, a second needle 30 is shown adjacent to the needle 28. A nuclear radiation source string comprising a fine aluminum or steel wire 32 carrying spaced apart radiation source elements 34 along its length is inserted into the needle 30. For example, the source elements 34 may comprise iridium (isotope 192), which is a β and γ source. Each source element 34 is approximately 0.5 mm in diameter and several millimeters long. In practice, several needles capable of containing a radiation source can be inserted at any one time. For example, up to eighteen needles may be used at one site. The source string would typically be inserted into selected needles, in a predetermined sequence.

FIG. 1c shows a variation of the arrangement of FIG. 1b. In this arrangement, the needle 30 is identical, but the fine aluminium or steel wire 32 carries a single radiation source element 34 at its end. In use, the needle 30 is inserted into a patient, with a number of needles 28 containing radiation sensor elements 10 arranged in a predetermined pattern around it. The source element 34 is inserted fully or to a predetermined depth in the needle 30, and then is retracted in timed stages, so that it remains at predetermined points along the length of the needle 30 for a selected dwell time. Thus, a predetermined radiation dose having a desired dose pattern is administered. The sensor elements 10 in the needles 28 around the needle 30 enable accurate monitoring of the administered dose. Alternatively, the instantaneous measured dose can be monitored and the position of the needle or needles 30, and/or the position of the source element(s) 34 in the needle(s) 30, can be changed to provide a desired overall radiation dose and dose pattern. The dose and dose pattern will typically be calculated so that a tumour or other target zone in the patient's body receives a predetermined radiation dose.

Instead of rigid needles 28 and 30, it is also possible to use flexible catheters to accommodate the radiation sensor elements 10 and the source elements 34. In some applications, the use of a flexible catheter may be preferable.

Figure 3:
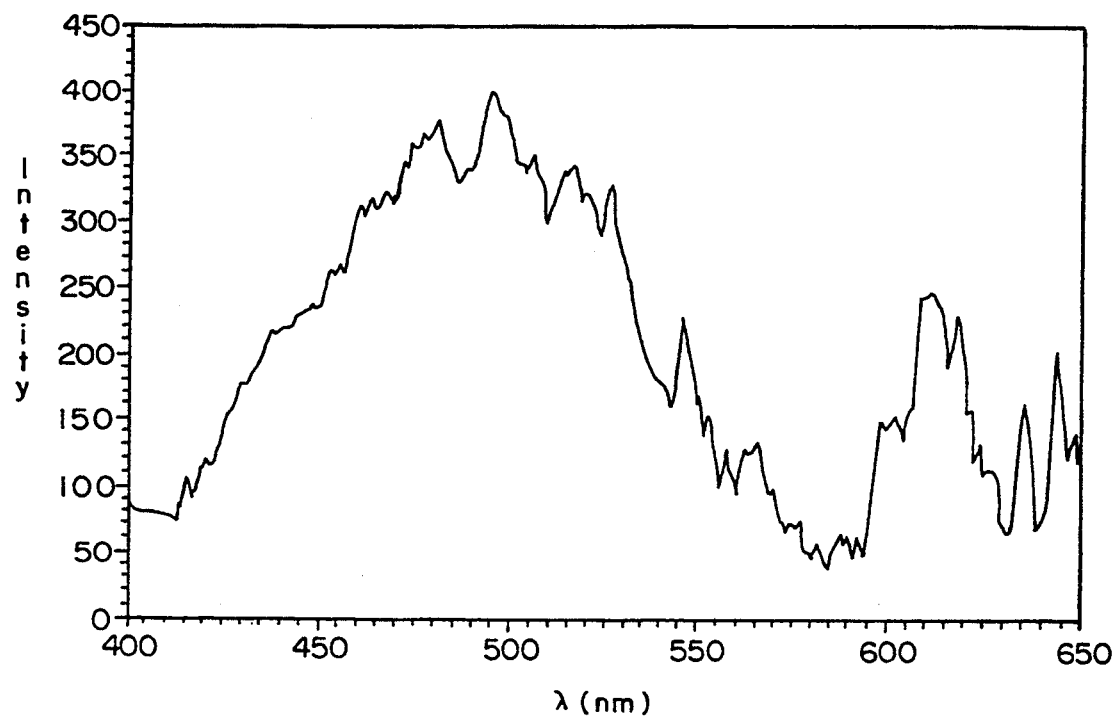
FIGS. 3, 4 and 5 are graphs illustrating the response of a radiation sensor element of the invention.
Figure 4:
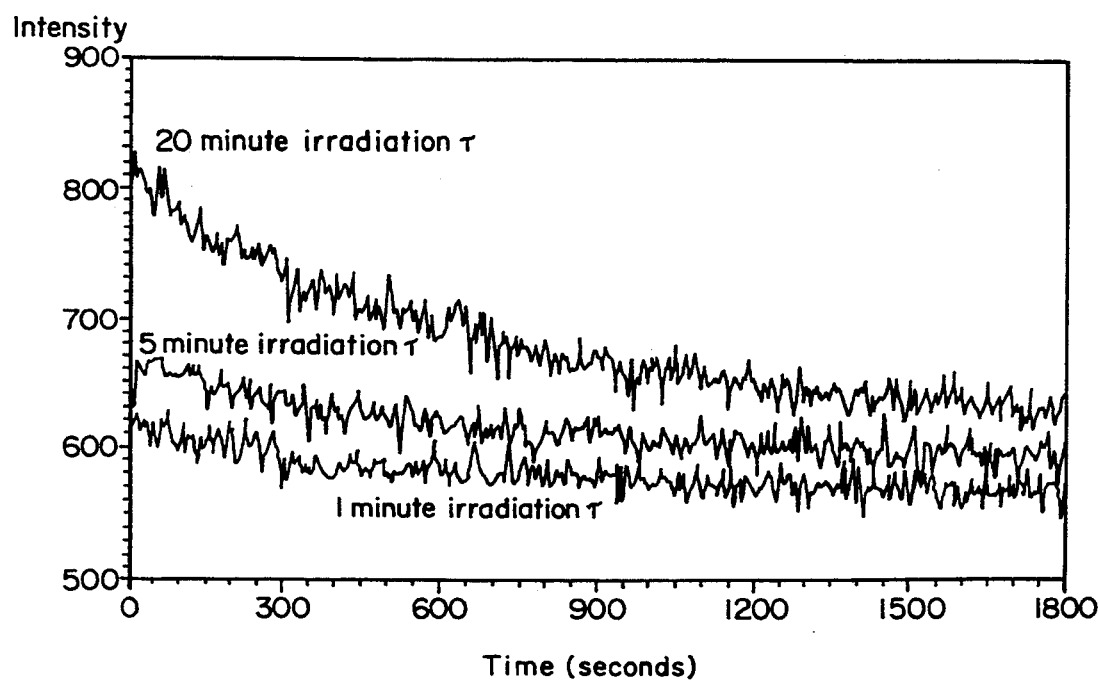

The diamond sensor element is subjected to radiation from the source string(s) in the adjacent irradiation needle or needles. Thus, the sensor element can be used to monitor the radiation dosage at a specific site in real time. If the sensor element is subjected to illumination by ultraviolet light (or, possibly, light of other wavelengths) it is stimulated to emit light, the intensity and spectrum of which is related to the intensity and type of radiation incident on the sensor element. Thus, in order to monitor the radiation intensity at the selected site, the sensor element is illuminated with light from the lamp 18 for a predetermined period, and the resulting light emissions from the sensor element are fed via the output portion of the optical fibre and the optical filter 22 to the photomultiplier tube 20. The optical filter 22 is selected to pass light emissions in the region of 516 to 536 nm, as the emission spectrum of the sensor element shows strong luminescence in the 420 to 550 nm region when stimulated by ultraviolet light at a wavelength of approximately 296 nm. Of course, filters having somewhat different transmission bandwidths within the relevant range of 420 to 550 nm could also be used, the purpose of the filter being to pass the light emitted by the diamond sensor element while rejecting the stimulating light. FIG. 3 shows the response characteristics of a diamond sensor element used in a prototype of the invention, which had been irradiated with $\gamma$ radiation and then stimulated with UV light at 296 nm. FIG. 4 shows the response of the sensor element to various periods of irradiation.

The output of the photomultiplier tube can be fed to an amplifier 24 and thence to a monitoring circuit 26 for further processing. The monitoring circuit 26 may simply be an indicator which provides an indication of the intensity of the radiation incident on the sensor element 10 at any particular time. However, in a more sophisticated version of the apparatus, the monitoring circuit 26 includes processing circuitry with associated memory for recording the measured radiation levels as a function of time. The apparatus may have multiple input channels to receive the outputs of a number of sensors. The apparatus may also be arranged to provide an output for controlling the irradiation of a patient, directly or indirectly.

Figure 5:
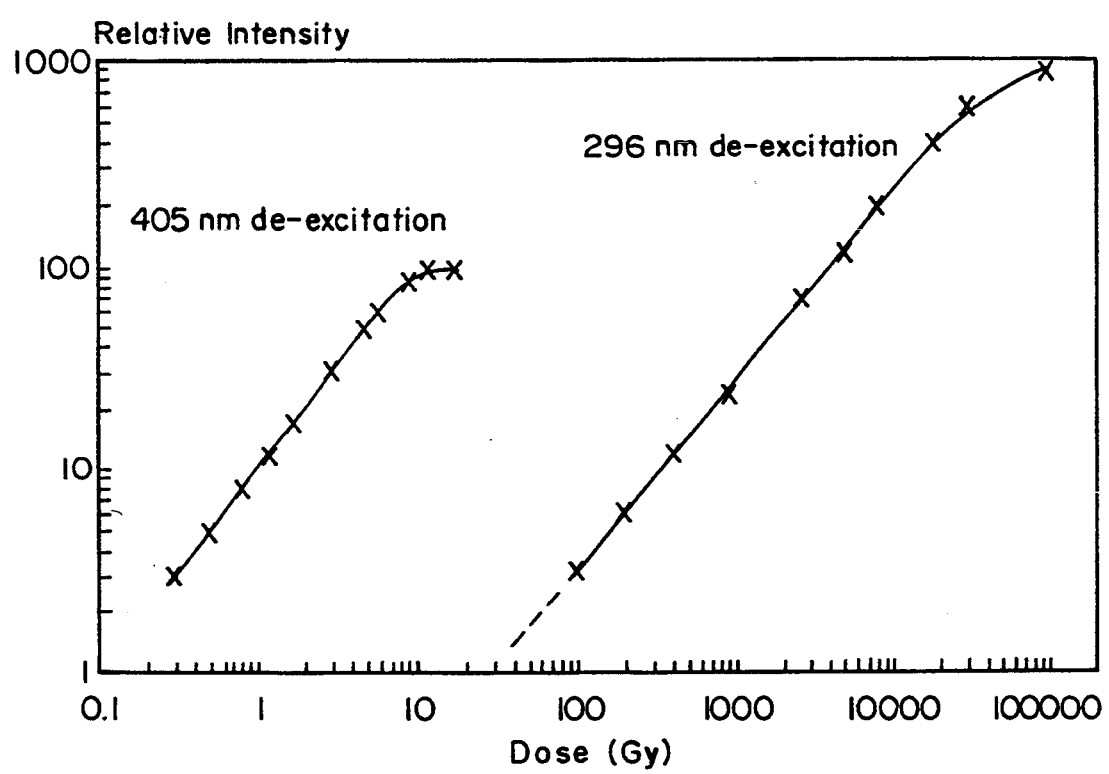

Instead of a mercury lamp 18, an ultraviolet laser, an LED, or another light source can be used. Any light source which excites useful light emission from the irradiated diamond sensor element can be used. Ultraviolet light, with a wavelength around 296 nm, is preferred, but light in the near-ultraviolet region with a wavelength of less than about 400 nm can be used. In some cases, visible light can also be used. FIG. 5 illustrates the intensity (relative to the mass of the diamond sensor element) of light emitted by an irradiated diamond sensor element, using two different exciting light sources. The left-hand curve in FIG. 5 illustrates the response of the sensor to near-ultraviolet light of 405 nm wavelength, while the right-hand curve shows the response to ultraviolet light having a wavelength of 296 nm. The longer wavelength light interacts with relatively shallow traps in the diamond sensor, the population of traps by carriers being caused by relatively small radiation doses, while the shorter wavelength light stimulates the carrier population of deep traps caused by heavy radiation doses. In both cases, it can be seen that the relationship between radiation dose and emitted light intensity is substantially linear over a wide range. Generally, the exciting light source must generate light at a shorter wavelength than the light expected to be emitted by the sensor. The photomultiplier tube 20 and its associated optical filter 22 can be replaced by another light sensitive device.

The invention allows accurate in vivo monitoring of the radiation dose applied to a patient, even when the radiation is applied at a site deep within the patient's body. The good tissue equivalence of the diamond sensor element improves the reliability of the radiation measurements.

Various other applications of the invention are possible. For example, sensors according to the invention can be used in plastics processing and in food packaging/processing applications. In both of these cases, thermal readouts are not practical, and in the case of plastics processing, high radiation levels (10 000 Gy) are involved. In the nuclear power industry, sensors according to the invention can be used for measurement of radiation levels both during shutdown and under power. The absence of electrical conductors in the sensor and the fact that optical fibres are radiation resistant is of value here. The relatively small size and convenience of use of probes according to the invention and their suitability for generating in situ readouts also makes the probes of the invention useful for radioactive tracing of leaks.

Figure 2A:
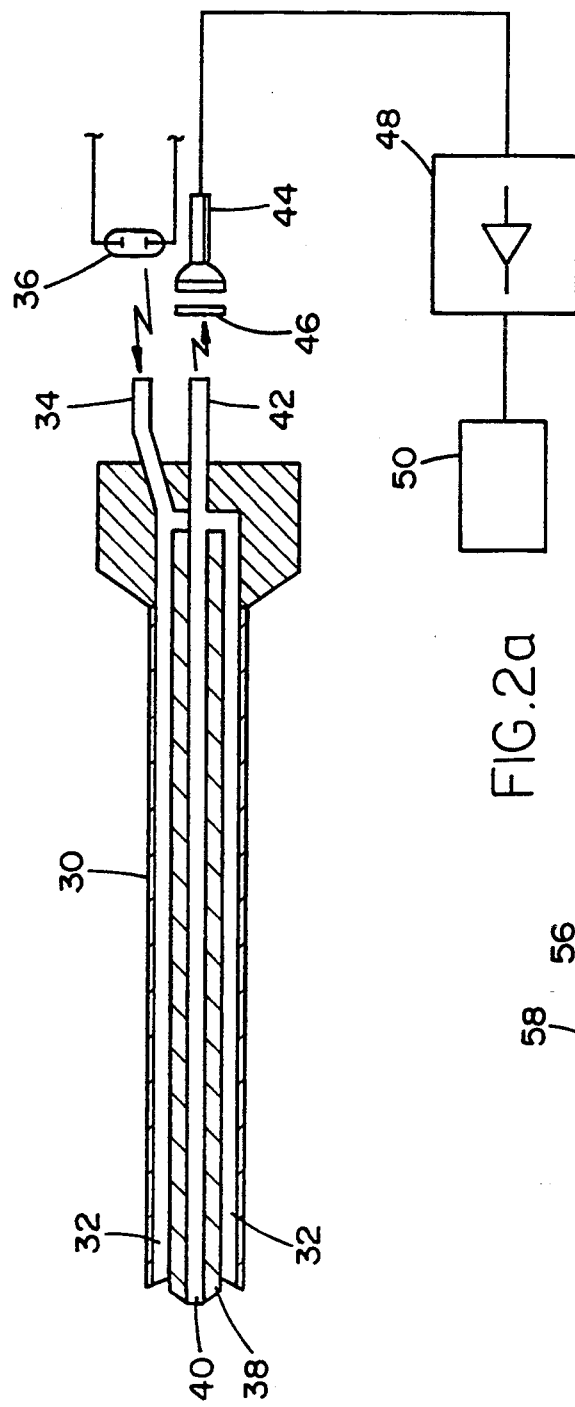
FIGS. 2a and b are schematic illustrations of another embodiment.
Figure 2B:
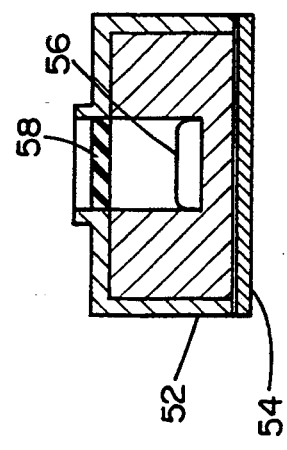

FIGS. 2a and 2b illustrate a second embodiment of the invention. In FIG. 2a, a reading head or probe is shown which comprises an outer metal tube 30 with a set of optical fibres 32 arranged axially along its inner surface. The optical fibres 32 are connected to an input fibre 34 which can be fed with light of a selected wavelength from a mercury lamp 36 or the like. The reader head also includes a central metal tube 38 which houses a further optical fibre 40. The optical fibre 40 has an input portion at the leftmost end of the reading head in the drawing, and an output portion 42 which is arranged to direct light detected by the input portion to a photomultiplier 44 or the like.

As in the embodiment of FIGS. 1a, 1b and 1c, the photomultiplier is fitted with an optical filter 46 and provides an output to an amplifier 48 and to a monitoring circuit 50.

In FIG. 2b, a radiation sensor element is shown. The sensor comprises a light tight housing 52, which has a layer of double sided adhesive tape or another adhesive material 54 on its underside for fixing the sensor to a product or package to be irradiated. Within the sensor is a diamond sensor element 56 which has a flat upper surface and which is typically less than 1 mm in diameter. In other respects, the sensor element 56 is similar to the sensor element 10 of FIG. 1a. The top section 58 of the sensor housing is made of rubber, which can be penetrated by the tip of the probe. The sensor can be as small as a button cell battery.

To use the sensor, it is attached, using the double sided tape 54, to a selected product or package. After the irradiation process, the tip of the probe or reading head is pushed into the rubber section 58 protecting the sensor element 56, so that the end of the reading head abuts the sensor element. The lamp 36 is operated, illuminating the sensor element 56 via the output ends of the optical fibres 32 for a predetermined period, and the resulting light emissions from the sensor element are detected by the input portion of the optical fiber 40 and fed via its output portion 42 to the photomultiplier tube 44, via the optical filter 46.

In a relatively simple version of the apparatus, the monitoring circuit 50 may simply be an indicator which provides an indication of the radiation dosage received by the sensor element 56. However, in a more sophisticated version of the apparatus, the monitoring circuit 50 can be arranged to relate the measured radiation dose to an input signal from a bar code reader, so that the radiation dose may be related to a particular product or package, marked with a bar code, for quality control.

This embodiment of the invention is particularly useful for monitoring high radiation doses such as those used in the radio-sterilisation and radio-processing industries. The small sensor 52 allows the monitoring of the radiation dose applied to a product at a selected site, whether on the surface of the product or inside it.

The use of exciting light with a wavelength of 296 nm accesses very deep trapping levels inside the diamond sensor element, which are sensitive mainly to relatively high radiation doses. The atomic number of diamond, being equal to 6, makes the use of sensors of the kind described particularly suitable for the monitoring of radiation applied to low atomic numbered materials or products such as hypodermic syringes, food and certain pharmaceutical products.

We claim:
1. A method of monitoring nuclear radiation comprising:
   a) providing a diamond radiation sensor element having a nitrogen impurity concentration of less than 150 ppm;
   b) subjecting the sensor element to nuclear radiation;
   c) stimulating the sensor element with light of a selected wavelength or range of wavelengths shorter than the wavelength of light emitted from the sensor element; and
   d) monitoring resultant light emissions from the sensor element.

2. A method according to claim 1 including stimulating the sensor element and monitoring the resultant light emissions therefrom via a common light conduit.

3. A method according to claim 2 wherein the common light conduit is an optical fibre, the sensor element being located at a first end of the fibre and the stimulating light being applied to a second end of the fibre, the resultant light emissions also being monitored at the second end of the fibre.

4. A method according to claim 3 wherein the second end of the fibre has an input portion and an output portion, the stimulating light being applied to the input portion and the resultant light emissions being monitored via the output portion.

5. A method according to claim 4 wherein the resultant light emissions are passed through an optical filter selected to pass light in a predetermined spectral range corresponding to that of the expected resultant light emissions.

6. A method according to claim 5 wherein the filtered resultant light emissions are amplified by photomultiplier means to provide an electronic signal corresponding to the intensity of the emissions, the electronic signal being processed to derive an indication of the intensity of the radiation incident on the sensor.

7. A method according to claim 1 wherein the sensor element is inserted into a first needle or catheter which is inserted into the body of a patient.

8. A method according to claim 7 wherein at least one nuclear radiation source element is inserted into a second needle or catheter which is inserted into the body of the patient adjacent to the first needle or catheter.

9. A method according to claim 1 wherein the sensor element is placed on or attached to an object and wherein the subjecting step includes the step of applying nuclear radiation to said object.

10. A method according to claim 9 including the step of adjusting the duration, intensity, or site of application of the applied nuclear radiation in response to the monitored light emissions from the sensor element, according to predetermined criteria.

11. A method according to claim 10 including adjusting the position of the at least one radiation source element relative to the sensor element, to provide a desired overall radiation dose and dose pattern.

12. A sensor for monitoring nuclear radiation comprising:
   a) a diamond radiation sensor element having a nitrogen impurity concentration of less than 150 ppm;
   b) a light conduit adapted to be attached to or held adjacent to the sensor element, the light conduit having an input portion which can be fed with light of a selected wavelength or range of wavelengths shorter than the wavelength of light emitted by the sensor element to stimulate the sensor element, and an output portion which can direct resultant light emissions from the sensor element to monitoring means; and
   c) filter means arranged to pass light emitted by the sensor element to the monitoring means and to reject the shorter wavelength stimulating light.

13. A sensor according to claim 12 wherein the light conduit is an optical fibre having a first end which is fixed to or held adjacent to a contact site on the sensor element, and a second end which is bifurcated to define the input and output portions of the sensor.

14. A sensor according to claim 13 wherein the sensor element is fixed to the first end of the optical fibre by means of adhesive.

15. A sensor according to claim 13 wherein the sensor element and the first end of the optical fibre are held in contact by mechanical clamping means.

16. A sensor according to claim 12 wherein the diamond sensor element is selected to have a nitrogen impurity concentration of between 10 and 150 ppm.

17. A sensor according to claim 16 wherein the sensor element is selected to have a nitrogen impurity concentration between 10 and 60 ppm.

18. A sensor according to claim 16 wherein the sensor element is selected to have a boron concentration in the range 0.1 to 10 ppm.

19. A sensor for monitoring nuclear radiation comprising:
   a) a diamond radiation sensor element having a nitrogen impurity concentration of less than 150 ppm;
   b) a light tight housing defining a cavity in which the sensor element is supported;
   c) a probe engagable with the cavity in the housing and including at least one light conduit having an input portion which can be fed with light of a selected wavelength or range of wavelengths shorter than the wavelength of light emitted from the sensor element to stimulate the sensor element, and an output portion which can direct resultant light emissions from the sensor element to monitoring means; and d) filter means arranged to pass light emitted by the sensor element to the monitoring means and to reject the shorter wavelength stimulating light.

20. A sensor according to claim 19 wherein the probe supports at least one first optical fibre having an input portion which can be fed with light of a selected wavelength or range of wavelengths, and an output portion for directing the light onto the sensor element to stimulate it; and a second optical fibre having an input portion for receiving resulting light emissions from the sensor element, and an output portion for directing the light emissions to monitoring means.

21. A sensor according to claim 20 wherein the probe comprises a tubular body with the second optical fibre disposed axially therein, and a plurality of first optical fibres being disposed about the second fibre and parallel thereto, so that light from the output portion of the first optical fibre is directed to an outer region of the sensor element in use, and light emissions from an inner region of the sensor element are received by the input portion of the second optical fibre in use.

22. A sensor according to claim 20 wherein the cavity of the light tight housing is closed with a membrane which can be pierced by the tip of the probe when the probe is engaged with the cavity.

23. A sensor according to claim 20 wherein the light tight housing includes fastening means for securing the housing to a surface.

24. A sensor according to claim 19 wherein the diamond sensor element is selected to have a nitrogen impurity concentration of between 10 and 150 ppm.

25. A sensor according to claim 24 wherein the sensor element is selected to have a nitrogen impurity concentration of between 10 and 60 ppm.

26. A sensor according to claim 24 wherein the sensor element is selected to have a boron concentration of between 0.1 and 10 ppm.

27. An apparatus for monitoring nuclear radiation comprising a sensor element according to claim 12 or claim 19, a light source for generating light of a selected wavelength or range of wavelengths shorter than the wavelength of light emitted from the sensor element, and monitoring means for receiving resultant light emissions from the sensor.

28. Apparatus according to claim 27 wherein the light source provides an intense output in the ultraviolet or near-ultraviolet region.

29. Apparatus according to claim 28 wherein the light source is a mercury lamp, an LED or a laser device.

30. Apparatus according to claim 27 wherein the monitoring means comprises photomultiplier means.

31. Apparatus according to claim 30 wherein the photomultiplier means is provided with a filter selected to pass light in a predetermined spectral range corresponding to that of the expected resultant light emissions from the sensor element, and to reject light from the light source.

32. Apparatus according to claim 31 wherein the filter is selected to pass light with a wavelength between 420 and 550 nm.

33. Apparatus according to claim 32 wherein the filter is selected to pass light with a wavelength between 516 and 536 nm.

34. Apparatus according to claim 30 wherein the monitoring means includes amplifier means for amplifying the output of the photomultiplier means, and processing means for deriving an indication of the intensity of the radiation incident on the sensor element therefrom.

* * * * *

UNITED STATES PATENT AND TRADEMARK OFFICE
CERTIFICATE OF CORRECTION

PATENT NO.  : 5,399,868
DATED       : March 21, 1995
INVENTOR(S) : Barbara L. Jones, et al.

It is certified that error appears in the above-indentified patent and that said Letters Patent is hereby corrected as shown below:

On the Title Page, item [30]: "9205458" should read --9205458.4--

Signed and Sealed this

Twenty-third Day of January, 1996

Attest:

BRUCE LEHMAN

Attesting Officer     Commissioner of Patents and Trademarks